US006747378B2

(12) United States Patent  
Brackett

(10) Patent No.: US 6,747,378 B2
(45) Date of Patent: Jun. 8, 2004

(54) DUAL STIFFNESS BEARING DAMPING SYSTEM

(75) Inventor: Norman C. Brackett, North Reading, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 09/933,496

(22) Filed: Aug. 20, 2001

(65) Prior Publication Data

US 2003/0034700 A1 Feb. 20, 2003

(51) Int. Cl.[7] .................................................. H02K 5/24
(52) U.S. Cl. .......................... 310/51; 384/582; 74/572; 74/574
(58) Field of Search ........................... 310/74, 51, 90; 384/581, 582, 618, 620; 74/572, 574

(56) References Cited

U.S. PATENT DOCUMENTS

| | | | | |
|---|---|---|---|---|
| 4,163,914 A | * | 8/1979 | Keyes | 310/103 |
| 4,236,426 A | * | 12/1980 | Meinke et al. | 74/574 |
| 4,639,150 A | | 1/1987 | Habermann | 384/536 |
| 5,044,789 A | * | 9/1991 | Damon et al. | 384/581 |
| 5,235,227 A | * | 8/1993 | Fazekas | 310/51 |
| 5,239,886 A | * | 8/1993 | Kohring | 74/574 |
| 5,504,381 A | * | 4/1996 | Kato | 310/51 |
| 5,612,583 A | * | 3/1997 | Crucq et al. | 310/90 |
| 6,354,988 B1 | * | 3/2002 | Carson et al. | 494/82 |

OTHER PUBLICATIONS

U.S. patent application Ser. No. 09/728,922, Kabir, filed Nov. 29, 2000, Mesh Bearing Damper For An Energy Storage Rotor.
Copy of Written Opinion dated Sep. 3, 2003.

* cited by examiner

Primary Examiner—Dang Le
(74) Attorney, Agent, or Firm—Edwards & Angell LLP; David G. Conlin; John J. Penny, Jr.

(57) ABSTRACT

In one aspect of the present invention discloses a dual-stiffness damping system for an evacuated energy storage system, the damping system comprising one or more flexible dampers and a plurality of more rigid bumpers, and a method of damping an evacuated energy storage system using dual-stiffness damping. Indeed, under normal operating conditions, a flexible damper, having a stiffness of about 500 lb/in to about 4000 lb/in, minimizes the rigid body critical speed of the rotor assembly of the energy storage system, allowing relative displacement between the stator assembly and rotor assembly but preventing the assemblies from physically contacting each other. Under more extreme external loading conditions, e.g., during an earthquake, the plurality of more rigid bumpers, having a stiffness of about 50,000 to 250,000 lb/in, engages the outer race of the bearing assembly to arrest further relative displacement substantially. In another aspect of the present invention, the dual stiffness damping system is combined with a bearing assembly and a mounting unit to produce a self-contained damping system that can be quickly and easily installed and replaced.

61 Claims, 4 Drawing Sheets

DUAL STIFFNESS BEARING DAMPING SYSTEM

FIELD OF THE INVENTION

The present invention relates to a damping system for the bearings of an energy storage system. More precisely, the invention relates to a dual stiffness damping system for a flywheel assembly that remains relatively flexible during normal operating conditions, so as to reduce rigid body critical speed of the flywheel assembly, but that arrests potentially deleterious relative deflections between rotor and stator assemblies during extreme external loads and/or vibrations, e.g., due to an earthquake.

DESCRIPTION OF THE RELATED ART

Evacuated energy storage systems, which internally produce and store kinetic energy in high speed rotors, or flywheels, have been developed as an alternative to batteries and other means of storing energy for at least 30 years. Evacuated energy storage systems typically comprise an energy-storing rotor, which includes an outer rim commonly made of high-strength, low-density composite fibers to maximize energy storage density, and a high-powered, high-strength generator that turns the rotor at high rotational velocities. To reduce energy loss through air friction, flywheel systems often, if not exclusively, are contained in an evacuated chamber, which is evacuated by a drag pump.

Drag pumps extract air from the energy storage system to create the vacuum necessary to reduce air friction losses. Typically, drag pumps can produce a vacuum of about $10^{-5}$ Torr. Loss of vacuum in an energy storage system, however, would produce higher temperatures due to additional frictional energy losses, which manifest as heat losses. If such an unevacuated energy storage system were equipped to monitor temperatures, which is common, the energy storage system likely would be shutting down constantly. Consequently, maintaining a vacuum is crucial to the continued operation of an evacuated energy storage system.

Flywheel rotors typically are rotatably supported on and guided by bearings that permit free motion between a moving part, e.g., the flywheel rotor shaft, and a fixed part, e.g., the stator assembly. Bearings typically minimize energy loss associated with friction and, correspondingly, minimize wear and tear on moving and fixed parts.

Two common bearing types known to the art are roller-type and fluid-type bearings. Mechanical bearings of the roller- or ball-type transfer loads imparted to the bearing by the moving part to a fixed support and, typically, are made of metal, alloys or ceramic materials. Mechanical bearings of the hydrostatic fluid-type transfer loads, instead, to a high-pressure fluid film that (i) separates moving from stationary parts and (ii) provides lubrication to the moving part.

Bearings generally are mounted in dampers for the purpose of, inter alia, (i) damping vibrations caused by, e.g., the rotation of the shaft, misalignment and/or eccentricity of the rotor with respect to the stator, and/or external vibrations; (ii) transferring heat away from the bearings; and (iii) reducing the load on the bearings. By accomplishing these three purposes, dampers produce longer bearing life and greatly facilitate magnetic levitation.

Typically, bearing dampers are flexible. Flexibility substantially reduces the rigid body critical speed of the flywheel rotor to a low frequency, which can be crossed safely, e.g., while the flywheel assembly powers up to its normal, design operating speed, with corresponding low energy. Indeed, as a rule, dampers should be relatively flexible with correspondingly low axial, radial, and transverse stiffness. For example, it is undesirable for a damper to affect the lift system of a rotor that is supported by magnetic bearings. Accordingly, axial stiffness should remain as low as possible. In another example, low radial stiffness reduces the dynamic force acting on the bearing, which can extend the bearing's service life. However low radial stiffness also enables radial displacement of the rotor assembly with respect to the stator assembly. In yet another example, stiffer dampers produce stiffer flywheel assemblies, which are more susceptible to problems associated with imbalances.

Accordingly, an ideal damper produces (i) relatively low damping when a flywheel assembly is operating at high speeds; (ii) relatively high damping when a flywheel assembly is operating at low speeds; and (iii) maximum damping at or near critical velocity. Indeed, critical velocity is a function of and proportional to damper stiffness. The less stiff the damper is, the lower the critical velocity is. Accordingly, less overall damping is required than if a stiffer damper were used. Still, at critical velocity, a maximum amount of the overall damping is required. The opposite is also true, i.e., in relative terms, the greater the damper stiffness is, the higher the critical velocity is. As a result, the flywheel assembly requires more overall damping and, moreover, a maximum amount of the overall damping is required at or near critical velocity.

One problem with flexible dampers, however, is that, in contrast with more rigid dampers, flexible dampers permit relatively large deflections, displacements, and/or movements, which, under normal, i.e., design, operating conditions, is acceptable. However, under abnormal or a typically operating conditions, e.g., during a period of extreme external loads and/or vibrations such as from an earthquake or other large dynamic force, flexible dampers of the prior art are unsuitable. Indeed, excessive deflection during periods of extreme external vibrations can cause flywheel assembly moving parts to contact stationary parts with potentially catastrophic consequences.

For example, during an earthquake, the stator assembly accelerates as a function of the acceleration and attenuation of the earthquake but the rotor, which is magnetically levitated, resists acceleration. Accordingly, the acceleration forces cause the stator assembly to displace with respect to the rotor. If the stator assembly displaces enough, it could come into contact with the rotor, further causing one or more of the following:

(i) breakage;
(ii) local overheating, which can destroy the material properties of the rotor, stator and/or other component parts of the energy storage system;
(iii) damage to the rotor further causing a misbalance, which makes the rotor dynamically unstable; and/or
(iv) damage to the rotor increasing the clearance between the rotor and stator assemblies, which additional clearance could exceed the capability of the drag pump to effectively evacuate the energy storage system, causing a loss of vacuum.

This produces a dilemma. The drag pump operates more efficiently and more effectively the closer the component parts of the energy storage system, e.g., the stator and rotor assemblies, are with respect to one another. Ideally, one desires zero tolerance between the rotor and the stator assemblies. However, in practical application, which accounts for typically displacement due to internal vibrations and ambient conditions, a clearance of about 0.015 inches (15 mils) with a tolerance of about +/−2 mils is preferred. Accordingly, drag pumps must be able to evacuate the flywheel assembly based on a maximum clearance of about 17 mils.

However, a typical operating conditions demand greater clearances to provide a greater factor of safety. Accordingly, the clearance would have to be greater than 17 mils. Furthermore, a larger drag pump might be needed. Moreover, the flywheel assembly likely would be larger.

SUMMARY OF THE INVENTION

Thus, it would be desirable to produce a bearing damping system that dampens vibrations, i.e., reduces the amplitude of the vibrations, induced by the rotation of a shaft, deflection of the shaft, and/or by the misalignment, or eccentricity, of the shaft that occur during normal operating conditions. Moreover, it would be desirable to produce a bearing damper system that is flexible over a short relative deflection distance of the stator assembly relative to the rotor assembly, but whose stiffness increases dramatically thereafter to further arrest deflections to prevent deleterious contact between moving and stationary parts of the flywheel assembly.

Therefore, the present invention produces a bearing damping system that under normal operating conditions provides sufficient radial damping to protect mechanical bearings by substantially lowering the amplitude of vibrations.

Furthermore, the present invention produces a bearing damping system that under normal operating conditions substantially lowers the load on the bearing to enhance bearing life.

Additionally, the present invention produces a bearing damping system that under normal operating conditions provides minimal radial stiffness to enhance bearing life and to reduce the rigid body critical speed of the flywheel assembly.

Furthermore, the present invention produces a bearing damping system that under normal operating conditions provides minimal axial and transverse stiffness to minimize operating moments substantially and to facilitate magnetic levitation.

The present invention also produces a bearing damping system that substantially enhances bearing life by conducting heat away from the bearings.

Additionally, the present invention produces a bearing damping system that under normal operating conditions is flexible over a short deflection distance, e.g., about 10 mils, but which produces dramatically increased stiffness thereafter to arrest substantially any further deflection.

Accordingly, the present invention produces a dual stiffness bearing damping system that produces low stiffness and flexible damping behavior over short relative deflection distances but whose stiffness and damping increases dramatically thereafter to arrest or otherwise limit further relative deflection. Although, in one aspect of the present invention the bearing damping system ultimately produces a higher rigid body critical velocity than for a totally flexible damper or damping system, the design operating speed remains much greater than the critical velocity. Accordingly, vibrations and associated relative deflections at or near critical velocity do not become problematic.

In one aspect of the present invention, the bearing damping system comprises a flexible bearing damper in combination with more rigid bumpers. The flexible bearing damper, which can be fabricated from, e.g., an elastomer, wire mesh, and the like, accommodates relative displacements between the flywheel rotor and stator assemblies, e.g., of about 10 mils. The rigid bumper, which can be fabricated from, e.g., aluminum, substantially limits further relative deflection after about 10 mils. As a result, when the rigid bumper frictionally engages the outer race of the bearing, radial forces are transferred to the rotor assembly, which displaces jointly with the stator assembly, preventing the two assemblies from physically contacting and frictionally engaging each other.

Another aspect of the present invention includes a self-contained bearing assembly system for an evacuated energy storage device comprising (i) a bearing or bearing assembly; (ii) a mounting assembly, further comprising an upper damper grounding plate, a lower damper grounding plate, and a circumferential mounting plate; (iii) at least one flexible damper that is securely and removably attached to the mounting assembly; and (iv) a plurality of more rigid bumpers that is contiguous to the upper and lower mounting plates of the mounting assembly.

Yet another aspect of the present invention includes a method of damping an evacuated energy storage system that is subject to extreme external vibrations, comprising the steps of (i) controlling the relative displacement of the stator assembly with respect to the rotor assembly, e.g., using a flexible bearing damper; and (ii) arresting further relative displacement of the stator assembly with respect to the rotor assembly using one or more rigid bumpers.

Still another aspect of the present invention includes an evacuated energy storage system having a dual-stiffness bearing damping system comprising a flexible bearing damper in combination with more rigid bumpers as described above. In a further aspect of the present invention, the present invention includes an evacuated energy storage system having a self-contained bearing assembly system for an evacuated energy storage device comprising (i) a bearing or bearing assembly; (ii) a mounting assembly, further comprising an upper damper grounding plate, a lower damper grounding plate, and a circumferential mounting plate; (iii) at least one flexible damper that is securely and removably attached to the mounting assembly; and (iv) a plurality of more rigid bumpers that is contiguous to the upper and lower mounting plates of the mounting assembly.

BRIEF DESCRIPTION OF THE DRAWINGS

For a fuller understanding of the nature and desired objects of the present invention, reference is made to the following detailed description taken in conjunction with the accompanying drawing figures wherein like reference character numbers denote corresponding parts throughout the several views and wherein.

DETAILED DESCRIPTION OF THE INVENTION AND ITS PREFERRED EMBODIMENTS

As previously stated, flywheel-based, evacuated energy storage devices ("flywheel assemblies") are relatively simple devices for readily storing and recovering energy. Conceptually, the rotor of the flywheel is rotated and mechanical kinetic energy is stored, e.g., primarily in the outermost portion, or rim, of the flywheel assembly. The amount of energy stored in the rim of a flywheel assembly is directly proportional to its mass and to the square of the rotational velocity of the flywheel. Consequently, to those skilled in the art, it is practical to develop flywheels that rotate at ever-increasing velocities.

Because state-of-the-art flywheel assemblies are designed to operate at increasingly higher velocities, designers must be concerned with transitioning the flywheel assembly through its critical velocity during power up. Indeed, during this transition, the flywheel assembly is subjected to deleterious resonance as the operating speed transitions to and then past the critical velocity. Resonance produces, inter alia, internal vibrations that affect the flywheel assembly in a number of ways. Primarily, however, internal vibrations produce relative displacement of the stator assembly with respect to the rotor assembly. To prevent physical contact between the two assemblies, a clearance is provided between the moving and non-moving parts.

To further exacerbate relative displacement due to resonance, many state-of-the-art flywheels employ high-tensile strength, low-density materials, e.g., composite fiber materials, in the rim, which substantially increase the energy storage potential of the flywheel. Correspondingly, however, this combination of low-density materials rotating at very high speeds produces a compatibility problem with more rigid components, e.g., the rotor hub on which they are disposed, which typically manifests as internal vibrations. Still another source of displacement-inducing vibrations is caused by the eccentricity of the flywheel itself. Indeed, inherent flywheel imbalances and/or imbalances due to axial misalignment produce vibrations that can be detrimental—if not destructive—to the flywheel assembly. Here again, vibrations affect the performance and life of the flywheel assembly and can cause potentially deleterious relative displacement.

Figure 1:
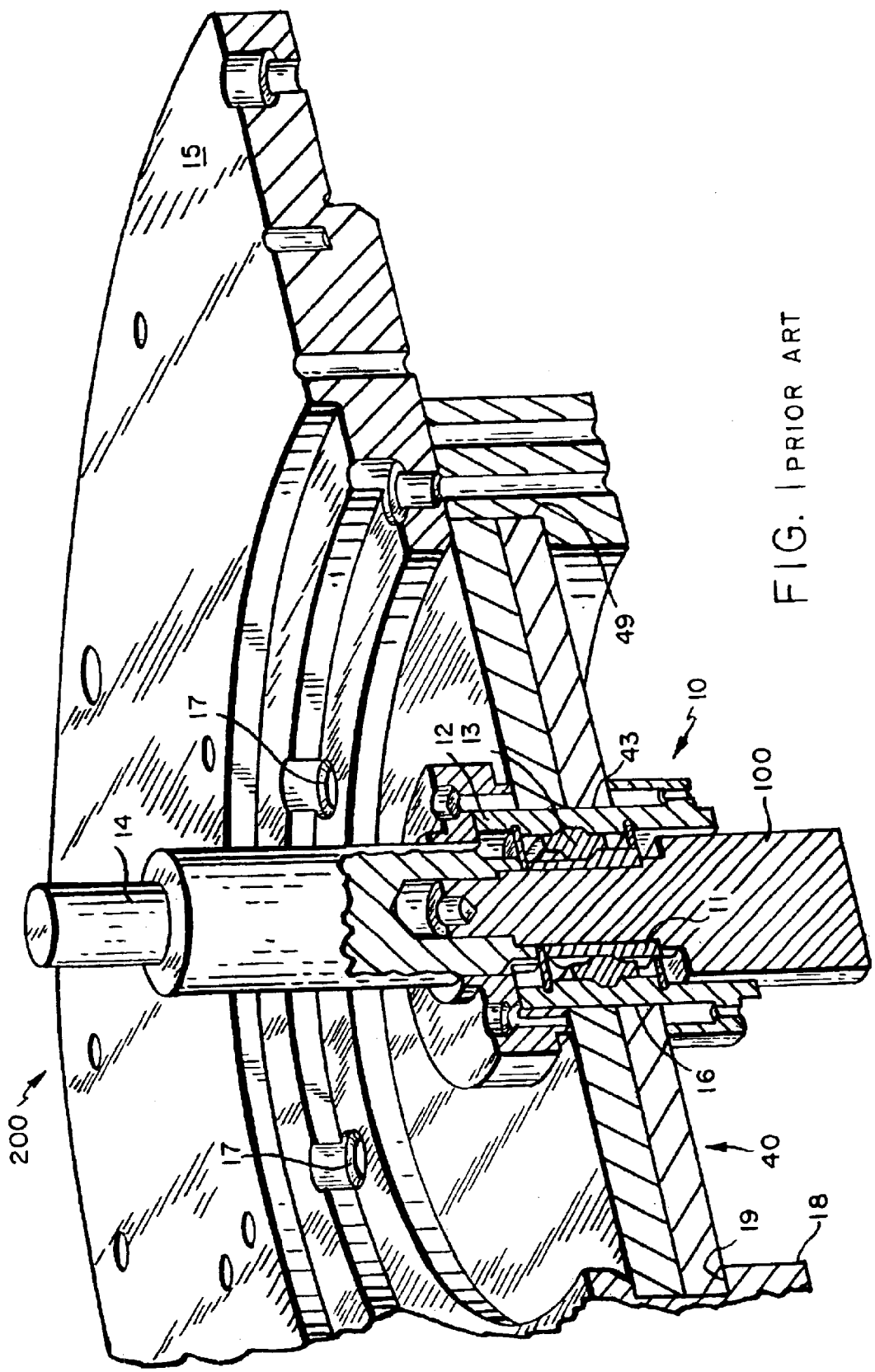
FIG. 1 is an isometric, cross-sectional view of an illustrative example of a bearing damping system according to the prior art.

In addressing problems associated with displacement-inducing vibrations, the operation of a prior art flywheel assembly 200 of a type that is well known in the prior art, including a description of the elements thereof, will be described in greater detail referring to FIG. 1. Typically, a high-energy motor drives a rotating, or rotary, shaft 100. The rotary shaft 100 turns the flywheel (not shown) of the flywheel assembly 200 at a relatively high rate of speed, or frequency (revolutions per second), storing kinetic energy. If the motor ever shuts down, e.g., due to a power outage, the kinetic energy stored in the flywheel enables the flywheel to continue to rotate. This continued rotation produces current by induction, which is to say electrical power. Accordingly, this current can be used to provide short-term, auxiliary or emergency power. Preferably, this limited period of time is less than the time needed to power up and bring online an auxiliary generator, e.g., a diesel generator.

The rotary shaft 100 of prior art flywheel assemblies 200, generally, is supported and guided by one or more bearings or bearing assemblies 10. The term "bearings" as used hereinafter includes bearing assemblies. For illustrative purposes only, a singular mechanical, roller-type bearing 10 is shown in FIG. 1. The bearing 10 comprises an inner race 11 and an outer race 12 with a rolling element 13 disposed and confined therebetween. A bearing lock nut 14 frequently secures the bearing 10 onto the end of the shaft 100.

The bearings 10 generally (i) support and guide the rotary shaft 100; (ii) permit free motion between the moving rotary shaft 100 and fixed parts; (iii) minimize energy loss and wear and tear due to friction; and (iv) dampen internal vibrations produced by the rotary shaft 100 and/or flywheel assembly 200. Notwithstanding the significance of the other, interrelated functions, supporting the rotary shaft 100 and damping vibrations during operation probably remain the primary role of a bearing 10. Indeed, it is imperative that bearings 10 for a rotary shaft 100 provide flexible support and, moreover, good radial damping.

To that end, typically, the inner race 11 of the bearing 10 is in tight interference fit with the rotary shaft 100. Thus, the shaft 100 and the inner race 11 of the bearing 10 rotate as a unit. The rolling element 13 rotatably and rollingly travels along the outer face of the inner race 11 as well as the inner face of the outer race 12. The outer race 12 does not rotate. When the shaft 100 displaces in a radial direction it exerts a force on the rolling element 13, which displaces. The rolling element 13 transfers displacement of approximate equal magnitude to the inner face of the outer race 12, causing it too to displace. The opposite is also true, which is to say that if the stator assembly displaces in a radial direction, the rolling element 13 transfers displacement of approximate equal magnitude from the inner face of the outer race 12 to the outer face of the inner race 11.

To reduce the amplitude of vibrations to the rotor 100, i.e., dampen the vibrations, which is especially important at or near critical velocity, the prior art employs bearing dampers 40. Indeed, typically, the inner periphery 43 of the bearing damper 40 is in tight interference fit with the outer face 16 of the outer race 12. Furthermore, the outer periphery 49 of the bearing damper 40 is fixedly secured, e.g., by a clamping device 18. FIG. 1 shows a bearing damper 40 that is confined and axially constrained in a groove 19 of a clamp 18. The clamp 18 can be securely and removably attached, e.g., using bolts 17, screws, and the like, to a mounting plate 15, which plate 15 is further securely and removably attached to the housing (not shown) of the flywheel assembly 200.

The prior art has extensively used thin-film type and mechanical, roller-type bearings. The disadvantages of these bearing types are discussed at great length in U.S. patent application Ser. No. 09/278,802 filed on Nov. 29, 2000, which is incorporated herein by reference. Mesh dampers 40 made of, e.g., metal, alloys, carbon composite materials, and the like, and/or elastomeric dampers 40 produce a seemingly optimal relationship between stiffness and damping, which is to say that these dampers provide relatively high levels of damping at relatively low levels of stiffness.

However, increased damper flexibility produces other problems. Indeed, the more flexible the damper 40 is, the greater the possible relative displacement between the rotor assembly 100 and the stator assembly. To account for and thereby minimize the effect of increased displacement, the clearance between the rotor assembly 100 and the stator assembly can be increased. Accordingly, this clearance can prevent internal vibrations and other factors that collectively can contribute to the relative displacement between the rotor assembly 100 and the stator assembly from causing the two assemblies to physical contact one another.

However, from a practical standpoint, the clearance between the rotor assembly 100 and the stator assembly is not without limitation. Indeed, the clearance between the rotor assembly 100 and the stator assembly also affects the efficiency, effectiveness, and/or size of the evacuating drag pump. The closer the assemblies are together, the more efficient the drag pump is. Accordingly, design of the flywheel assembly 200 can include a smaller drag pump, which would not have to work very hard. The opposite is also true. Indeed, the greater the spatial distance between the assemblies, the less efficient the drag pump is. Accordingly, flywheel assembly 200 design necessarily would have to include a larger drag pump, which would have to work very hard.

The problem with the prior art, then, is that the compromise clearance, which is suitable for normal operating conditions, is unacceptable, however, when the flywheel assembly 200 is subjected to extreme external vibrations, e.g., an earthquake, during which relative displacement of the stator assembly with respect to the rotor assembly 100 can exceed the clearance. Excessive displacement can have deleterious if not catastrophic consequences on the flywheel assembly 200.

Figure 2:
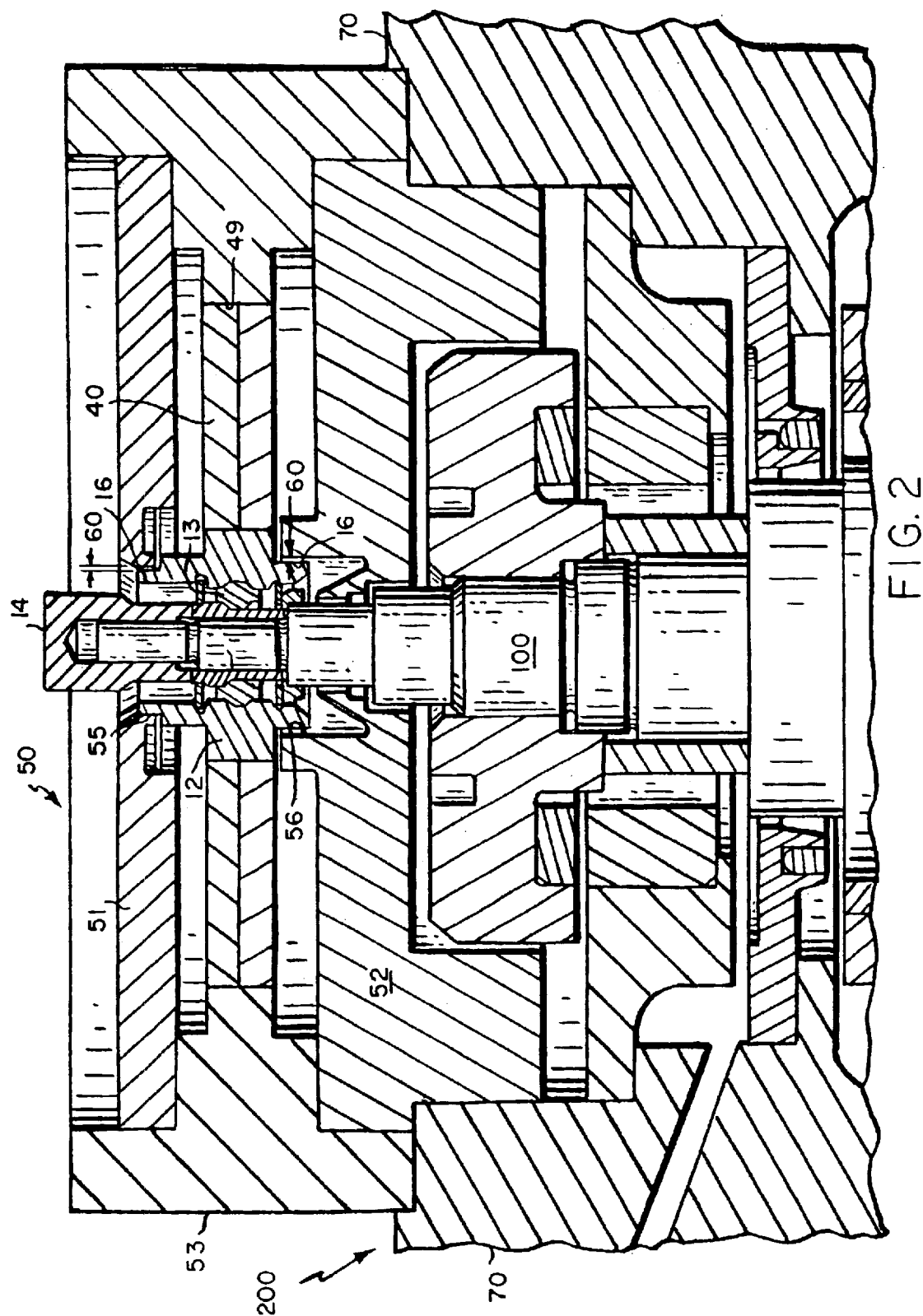
FIG. 2 is a cross-sectional view of illustrative example of a dual stiffness bearing damping system of the present invention.
Figure 4:
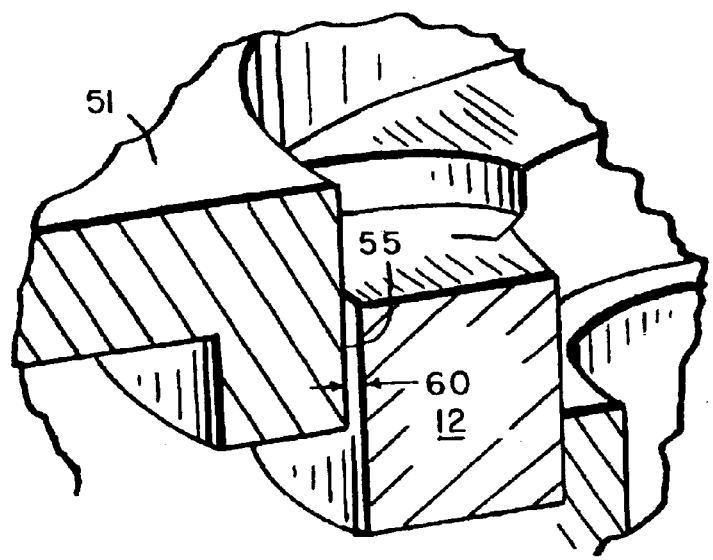
FIG. 4 is a detail view of an illustrative embodiment of the upper bumper.
Figure 5:
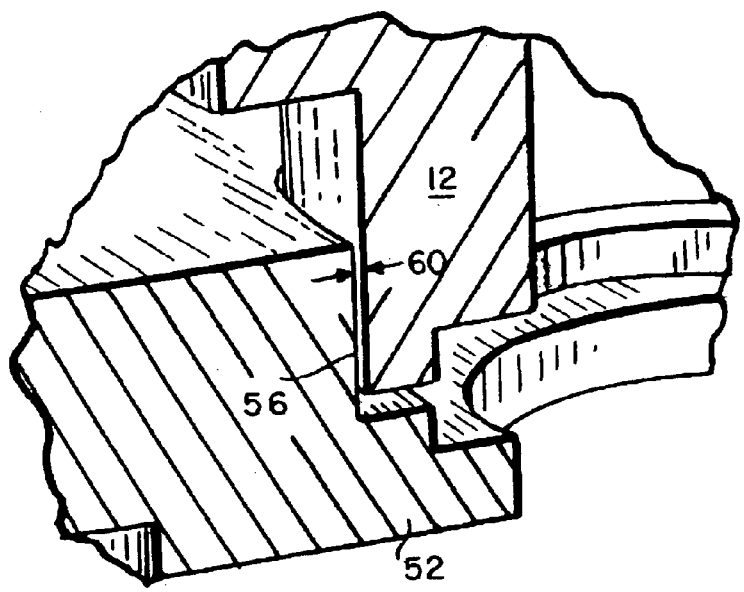
FIG. 5 is a detail view of an illustrative embodiment of the lower bumper.

The present invention, therefore, constitutes an improvement to the prior art. Indeed, one aspect of the present invention solves the afore-mentioned dilemma with respect to extreme external loads using a dual-stiffness bearing damping device 50, which will now be described in greater detail referring to FIGS. 2, 4, and 5. All of the elements of the flywheel assembly 200 that have been described above with respect to the prior art are present in the present invention and will not be described further. Furthermore, it should be noted that the embodiment depicted in FIG. 2 is illustrative for the purpose of describing the invention only and is not to be taken or construed as limiting.

The dual-stiffness bearing damping device 50 according to one aspect of the present invention comprises an upper damper grounding plate 51, having a first bumper 55, a lower damper grounding plate 52, having a second bumper 56, and a circumferential mounting plate 53. Preferably, the upper and lower damper grounding plates 51 and 52 and, respectively, the first and second bumpers 55 and 56 are manufactured, e.g., cast, monolithically of the same material, e.g., rubber, alloys, aluminum, plastics, composites, and the like, having a radial stiffness of about 50,000 pounds per in (lb/in) to about 250,000 lb/in., and more preferably about 200,000 lb/in. The grounding plates 51 and 52 are manufactured precisely. In one aspect, the clearance 60 between the bumpers 55 and 56 and the outer face 16 of the outer race 12 of the bearing 10 is about 10 mils with a tolerance of +/−2 mils. Accordingly, the drag pump (not shown) can be designed for 15 mils clearance with a tolerance of +/−2 mils, which will always be greater than the clearance 60 of 10 mils +/−2 mils.

Thus, during normal operating conditions, the bumpers 55 and 56 do not contact the outer race 12 of the bearing 10. Indeed, under normal operating conditions, the flexible bearing damper 40 controls the behavior of the bearing damping device 50, providing a radial stiffness of between about 500 and 4000 lb/in, and more preferably about 1200 lb/in. Radial stiffness of this magnitude permits non-destructive relative displacement between the stator assembly and the rotor assembly 100. However, during extreme external loading, e.g., during an earthquake, after the stator assembly has displace a distance equal to the clearance 60, e.g., 10 mils +/−2 mils, the bumpers 55 and 56 radially and frictionally engage the outer face 16 of the outer race 12 of the bearing 10, which then sequentially transfers radial load to the rolling element 13, the inner race 11, and finally to the rotary shaft 100. Accordingly, during extreme loading conditions, the bumpers 55 and 56 and not the flexible bearing damper 40 control the behavior of the bearing damping device 50, producing a radial stiffness of about 50,000 lb/in to about 250,000 lb/in, and more preferably 200,000 lb/in, which almost instantaneously decelerates the rotor 100, but prevents deleterious or catastrophic contact between the stator and rotor assemblies 100. Essentially, once the bumpers 55 and 56 engage the outer race 12 of the bearing 10, the stator and rotor assemblies 100 displace as a single unit so that there is no further relative displacement preventing physical, i.e., frictional, contact between the moving and non-moving assemblies.

The circumferential mounting plate 53 can be manufactured from the same or a different material that the bumper grounding plates 51 and 52. The mounting plate 53 is fixedly attached to, in tight interference fit with, or confines the outer periphery 49 of the flexible damper 40. In a preferred embodiment, the flexible damper 40 is an elastomeric, e.g., silicon rubber and the like, damper that is molded to the circumferential mounting ring 53.

In one aspect of the present invention, the grounding plates 51 and 52 are securely and removably attached to the circumferential mounting plate 53, e.g., using bolts, screws, adhesives, threading, and the like, and, further, the mounting plate 53 is securely and removably attached to the housing 70 of the flywheel assembly 200. Alternately, in a second aspect of the present invention, the lower grounding plate 52 is securely and removably attached to the housing 70 of the flywheel assembly 200, e.g., using bolts, screws, adhesives, threading, and the like and the circumferential mounting plate 53 is securely and removably attached to the upper and lower grounding plates 51 and 52, e.g., using bolts, screws, adhesives, threading, and the like.

The first and second bumpers 55 and 56 essentially comprise the center hub of the upper and lower bumper grounding plates 51 and 52, respectively. In one aspect of the present invention, the bumpers 55 and 56 are solid and integral to the grounding plates 51 and 52. Those skilled in the pertinent art can vary the dimensions, e.g., thickness, length, and width, of the bumpers 55 and 56 to provide practically any desired radial stiffness. Indeed, the larger the dimensions are, the stiffer the bumper is going to be, which means there will be less relative displacement after the bumpers 55 and 56 engage the outer race 12 of the bearing 10 than would be the case if the dimensions were smaller.

In another aspect of the present invention, the bumpers 55 and 56 are not solid. Indeed, the bumpers 55 and 56 can be hollowed out, honeycombed, and the like to provide more flexibility. Here again, those skilled in the pertinent art can vary the size and shape of the bumpers 55 and 56 to provide practically any desired radial stiffness.

Preferably, the clearance 60 between the bumpers 55 and 56 and the outer race 12 of the bearing 10 is about 10 mils with a tolerance of about +/−2 mils. Elsewhere within the flywheel assembly 200 the clearance between moving and non-moving elements of the flywheel assembly 200 is about 15 mils +/−2 mils. The larger clearance is that which the drag pump must evacuate and it is kept as low as possible to improve the efficiency and effectiveness of the drag pump. For example, under the least favorable conditions in which the clearance 60 is at a maximum, e.g., 12 mils, and the drag pump is operating at its lower end, e.g., 13 mils, the drag pump still can effectively evacuate the flywheel assembly 200. The tighter the clearance 60, though, the more effective and efficient the drag pump.

Figure 3:
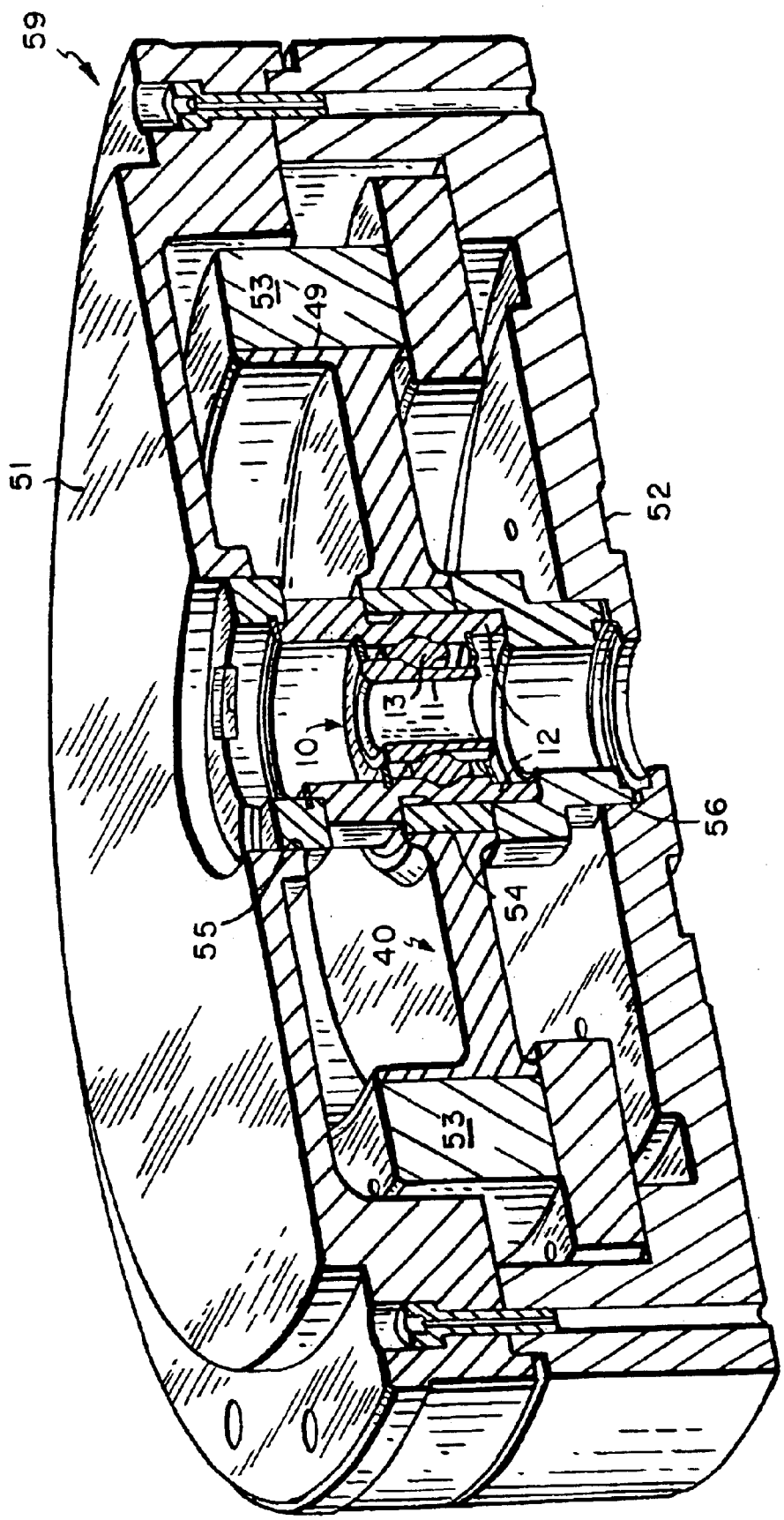
FIG. 3 is an isometric, cross-sectional view of an illustrative example of a self-contained bearing damper canister.

In another aspect of the present invention, the bearing damping device 50 comprises a self-contained unit, or canister, 59 that includes all of the elements described in the first embodiment and further comprises one or more flexible dampers 40 and the bearing 10. Such a self-contained unit 59 greatly simplifies replacement and, more importantly, the offline time during replacement. Referring now to FIG. 3, preferably, the flexible damper 40 is securely and removably attached to the mounting plate 53 and to an inner support ring 54. Indeed, in one aspect of the present invention, the flexible damper 40 can be adhesively attached to or in tight interference fit with the inner support ring 54, which itself is in tight interference fit with the bearing 10. Furthermore, the flexible damper 40 is fixedly secured to the mounting plate 53. If, for example, the flexible damper 40 is elastomeric, the damper 40 can be fixedly attached to the mounting plate 53 and/or the inner support ring 54 using one or more of adhesives, molding techniques known to the art, shrinking or constricting the elastomer damper 40 using cryogenics and then installing it against the mounting plate 53 and/or the inner support ring 54, by confining its outer periphery 49 in a groove in the mounting plate 53, and the like. Similarly, for example, if flexible damper 40 is a mesh-type, the damper 40 can be fixedly attached to the mounting plate 53 and/or inner support ring 54 using one or more of adhesives, shrinking or constricting the mesh damper 40 using cryogenics and then installing it against the mounting plate 53 and/or inner support ring 54, confining its outer periphery 49 in a groove in the mounting plate 53 and/or inner support ring 54, and the like. Those skilled in the art will realize the many combination of ways to install the flexible damper 40 within the mounting plate 53 and inner support ring 54, all of which are within the scope and spirit of this disclosure.

Installing and/or replacing the canister 59 on the rotary shaft 100 is/are quite simple. Indeed, the bearing locking nut 14 on the end of the rotary shaft 100 is removed; the entire canister 59 is fitted over the end of the rotary shaft 100 and placed on the shaft 100 so that the inner race 11 of the bearing 10 is in tight interference fit with the shaft 100; the canister 59 is securely and removably attached to the housing 70 of the flywheel assembly 200, e.g., using bolts, screws, clamps, a frictional fit, threading, and the like; and the bearing locking nut 14 is fitted onto the end of the rotary shaft 100 and securely and removably attached thereto.

Yet another aspect of the present invention includes a method of damping an evacuated energy storage system that is subject to extreme external vibrations, e.g., an earthquake or other dynamic force. Indeed, preferably, the method comprises the steps of (i) controlling the relative displacement of the stator assembly with respect to the rotor assembly; and (ii) arresting further relative displacement of the stator assembly with respect to the rotor assembly.

Preferably, one or more flexible bearing dampers of a type described above is or are configured and arranged so as to control the relative displacement of the stator assembly with respect to the rotor assembly. The flexible bearing dampers provide a radial stiffness of about 500 lb/in to about 4000 lb/in, and preferably about 1200 lb/in, which keeps the rigid body critical speed low, further providing adequate damping at that rigid body critical speed to minimize the amplitude of vibrations and, resultingly, the relative displacement of the two assemblies.

Further relative displacement of the stator assembly with respect to the rotor assembly, e.g., after about 10 mils, is arrested by using one or more rigid bumpers that frictionally engage the outer face of the outer race of the bearing. The rigid bumpers provide a radial stiffness far in excess of that of the flexible damper, e.g., about 50,000 lb/in to about 250,000 lb/in, and preferably about 200,000 lb/in, which decelerates the rotor 100 but dramatically limits further relative deflection between the rotor assembly 100 and the stator assembly.

Although a number of embodiments of the invention has been described, it should be obvious to those of ordinary skill in the art that other embodiments to and/or modifications, combinations, and substitutions of the present invention are possible, all of which are within the scope and spirit of the disclosed invention.

Indeed, in another embodiment, a gasket (not shown) can be fixedly attached to the outer face of the first and second bumpers 55 and 56 to decrease the dramatic increase in stiffness from, e.g., about 1200 lb/in under normal, i.e., flexible, operating conditions using a mesh or elastomer damper 40, to about 200,000 lb/in under extreme external vibration conditions in which the, e.g., aluminum, bumpers 55 and 56 engage the outer race 12 of the bearing 10. Providing gaskets assuages the almost instantaneous deceleration caused when the relatively stiff bumpers 55 and 56 frictionally engage the outer race 12 of the bearing 10. The material used for these gaskets can have a radial stiffness that is substantially greater than about 4000 lb/in but less than 50,000 lb/in, which, for example, can include rubber, plastics, composites, alloys, soft metals, and the like. The gasket can be fixedly attached to the bumpers 55 and 56, e.g., adhesively and/or by molding, welding, casting, and the like. Those skilled in the art will realize, however, that including a more flexible gasket to the bumpers likely will produce additional relative displacement after the gasket engages the outer race 12 of the bearing 10.

What is claimed is:

1. A damping system for an evacuated energy storage device, said device having a rotor assembly that is rotatably supported and guided by a bearing assembly, comprising a rolling element substantially confined between an inner and an outer race, and a stator assembly, the system comprising:
   one or more flexible dampers, each having a first stiffness; and
   a plurality of rigid bumpers, each of said plurality of rigid bumpers having a second stiffness, wherein said second stiffness is greater than said first stiffness, and wherein said bumpers frictionally engage the outer race during extreme loading.

2. The damping system as recited in claim 1, wherein the one or more flexible dampers comprises a mesh damper.

3. The damping system as recited in claim 1, wherein the one or more flexible dampers comprises an elastomeric damper.

4. The damping system as recited in claim 3, wherein the elastomeric damper is made of silicon rubber.

5. The damping system as recited in claim 1, wherein said rotor assembly and said stator assembly are configured and arranged so as to be separated by a first clearance at substantially all locations except in proximity of the outer race of the bearing assembly, whereat said outer race of said bearing assembly is configured and arranged to be separated from one of said plurality of rigid bumpers by a second clearance, to allow relative displacement of said stator assembly with respect to said rotor assembly.

6. The damping system as recited in claim 5, wherein the first clearance is about 13 to about 17 mils.

7. The damping system as recited in claim 6, wherein the first clearance is about 15 mils.

8. The damping system as recited in claim 5, wherein the second clearance is about 8 to about 12 mils.

9. The damping system as recited in claim 8, wherein the second clearance is about 10 mils.

10. The damping system as recited in claim 1, wherein said plurality of more rigid bumpers is fabricated from at least one of aluminum, metal, alloys, carbon, carbon-carbon composites, and carbon fiber composite materials.

11. The damping system as recited in claim 1, wherein said plurality of more rigid bumpers is configured and arranged so as to substantially limit further relative displacement between the rotor assembly and stator assembly by frictionally engaging the outer race of the bearing assembly after an initial, first relative displacement equal in magnitude to a second clearance that separates said outer race of said bearing assembly from said plurality of more rigid bumpers.

12. The damping system as recited in claim 11, wherein said second clearance has a magnitude of about 8 to about 12 mils.

13. The damping system as recited in claim 12, wherein said second clearance has a magnitude of about 10 mils.

14. The damping system as recited in claim 1, wherein the first stiffness of the one or more flexible dampers is about 500 lb/in to about 4000 lb/in.

15. The damping system as recited in claim 14, wherein the first stiffness of the one or more flexible dampers is about 1200 lb/in.

16. The damping system as recited in claim 1, wherein the second stiffness of the plurality of more rigid bumpers is about 50,000 lb/in to about 250,000 lb/in.

17. The damping system as recited in claim 16, wherein the second stiffness of the plurality of more rigid bumpers is about 200,000 lb/in.

18. A self-contained bearing assembly system for an evacuated energy storage device, said device further having a rotor assembly and a stator assembly, which assemblies are separated by a first clearance and a second clearance, the system comprising:
   a bearing assembly for rotatably supporting and guiding said rotor assembly, the bearing assembly further comprising:
      an inner race,
      an outer race, and
      a rolling element that is rollably disposed and confined between said inner and outer races;
   a mounting assembly, the mounting assembly further comprising:
      an upper damper grounding plate,
      a lower damper grounding plate, and
      a circumferential mounting plate;
   one or more flexible dampers, wherein an inner periphery of said one or more flexible dampers is in tight interference fit with said outer race of said bearing assembly and an outer periphery of said one or more flexible dampers is securely and removably attached to said circumferential mounting plate; and
   a plurality of more rigid bumpers, wherein at least one of said plurality of more rigid bumpers is configured and arranged on said upper damper grounding plate so as to be disposed in proximity of said outer race of said bearing assembly and one or more of said plurality of more rigid bumpers is configured and arranged on said lower damper grounding plate so as to be disposed in proximity of said outer race of said bearing assembly.

19. The bearing assembly system as recited in claim 18, wherein the one or more flexible damper comprises a mesh damper.

20. The bearing assembly system as recited in claim 18, wherein the one or more flexible damper comprises an elastomeric damper.

21. The bearing assembly system as recited in claim 20, wherein the elastomeric damper is made of silicon rubber.

22. The bearing assembly system as recited in claim 18, wherein the plurality of more rigid bumpers are configured and arranged so as to be separated from the outer race of the bearing assembly by a second clearance and elsewhere, the rotor assembly and the stator assembly are configured and arranged so as to be separated by a first clearance to allow relative displacement between said rotor and stator assemblies.

23. The bearing assembly system as recited in claim 22, wherein the first clearance is about 13 to about 17 mils.

24. The bearing assembly system as recited in claim 23, wherein the first clearance is about 15 mils.

25. The bearing assembly system as recited in claim 22, wherein the second clearance is about 8 to about 12 mils.

26. The bearing assembly system as recited in claim 25, wherein the second clearance is about 10 mils.

27. The bearing assembly system as recited in claim 18, wherein said upper and lower grounding plates and said plurality of more rigid bumpers are fabricated from at least one of aluminum, metal, alloys, carbon, carbon-carbon composites and carbon fiber composite materials.

28. The bearing assembly system as recited in claim 18, wherein said plurality of more rigid bumpers is configured and arranged so as to substantially limit further relative displacement between the rotor and stator assemblies by frictionally engaging the outer race of the bearing assembly after an initial relative displacement equal in magnitude to a second clearance that separates said outer race of said bearing assembly from said plurality of more rigid bumpers.

29. The bearing assembly system as recited in claim 28, wherein said second clearance has a magnitude of about 8 to about 12 mils.

30. The bearing assembly system as recited in claim 29, wherein said second clearance has a magnitude of about 10 mils.

31. The bearing assembly system as recited in claim 18, wherein the first stiffness of the one or more flexible dampers is about 500 lb/in to about 4000 lb/in.

32. The bearing assembly system as recited in claim 31, wherein the first stiffness of the one or more flexible dampers is about 1200 lb/in.

33. The bearing assembly system as recited in claim 18, wherein the second stiffness of the plurality of more rigid bumpers is about 50,000 lb/in to about 250,000 lb/in.

34. The bearing assembly system as recited in claim 33, wherein the second stiffness of the plurality of more rigid bumpers is about 200,000 lb/in.

35. The bearing assembly system as recited in claim 18, wherein the system further comprises a gasket that is fixedly attached to the plurality of more rigid bumpers, wherein said gasket is less rigid than said plurality of more rigid bumpers.

36. An evacuated energy storage device, said device comprising:
   a bearing assembly; said bearing assembly further comprising:
      an inner race,
      an outer race,
      a rolling element, wherein said rolling element is substantially confined between said inner and said outer race;
   a rotor assembly that is rotatably supported and guided by said bearing assembly;
   a stator assembly; and
   a dual stiffness damping system, the system comprising:
      one or more flexible dampers, each having a first stiffness; and a plurality of rigid bumpers, each of said plurality of rigid bumpers having a second stiffness, wherein said stiffness is greater than first stiffness, and wherein said bumpers frictionally engage the outer race during extreme loading.

37. The evacuated energy storage device as recited in claim 36, wherein the one or more flexible dampers of the dual stiffness damping system comprise a mesh damper.

38. The evacuated energy storage device as recited in claim 36, wherein the one or more flexible dampers of the dual stiffness damping system comprise an elastomeric damper.

39. The evacuated energy storage device as recited in claim 38, wherein the elastomeric damper is made of silicon rubber.

40. The evacuated energy storage device as recited in claim 36, wherein said rotor assembly and said stator assembly are configured and arranged so as to be separated by a first clearance at substantially all locations except in proximity of the outer race of the bearing assembly, whereat said outer race of said bearing assembly is configured and arranged so as to be separated from one of said plurality of rigid bumpers by a second clearance, to allow relative displacement of said stator assembly with respect to said rotor assembly.

41. The evacuated energy storage device as recited in claim 40, wherein the first clearance is about 13 to about 17 mils.

42. The evacuated energy storage device as recited in claim 41, wherein the second clearance device is about 8 to about 12 mils.

43. The evacuated energy storage device as recited in claim 36, wherein said plurality of more rigid bumpers is fabricated from at least one of aluminum, metal, alloys, carbon, carbon-carbon composites, and carbon fiber composite materials.

44. The evacuated energy storage device as recited in claim 36, wherein the first stiffness of the one or more flexible dampers is about 500 lb/in to about 4000 lb/in.

45. The evacuated energy storage device as recited in claim 36, wherein the second stiffness of the plurality of more rigid bumpers is about 50,000 lb/in to about 250,000 lb/in.

46. An evacuated energy storage device, said device comprising:
a self-contained bearing assembly system, said system comprising:
a bearing assembly for rotatably supporting and guiding said rotor assembly, the bearing assembly further comprising:
an inner race,
an outer race, and
a rolling element that is rollably disposed and confined between said inner and outer races;
a mounting assembly, the mounting assembly further comprising:
an upper damper grounding plate,
a lower damper grounding plate, and
a circumferential mounting plate;
one or more flexible dampers, wherein an inner periphery of said one or more flexible dampers is in tight interference fit with said outer race of said bearing assembly and an outer periphery of said one or more flexible dampers is securely and removably attached to said circumferential mounting plate; and
a plurality of more rigid bumpers, wherein at least one of said plurality of more rigid bumpers is configured and arranged on said upper damper grounding plate so as to be disposed in proximity of said outer race of said bearing assembly and one or more of said plurality of more rigid bumpers is configured and arranged on said lower damper grounding plate so as to be disposed in proximity of said outer race of said bearing assembly;
a rotor assembly that is rotatably supported and guided by said bearing assembly; and
a stator assembly.

47. The evacuated energy storage device as recited in claim 46, wherein the one or more flexible damper comprises a mesh damper.

48. The evacuated energy storage device as recited in claim 46, wherein the one or more flexible damper comprises an elastomeric damper.

49. The evacuated energy storage device as recited in claim 48, wherein the elastomeric damper is made of silicon rubber.

50. The evacuated energy storage device as recited in claim 46, wherein the plurality of more rigid bumpers are configured and arranged so as to be separated from the outer race of the bearing assembly by a second clearance and elsewhere, the rotor assembly and the stator assembly are configured and arranged so as to be separated by a first clearance to allow relative displacement between said rotor and stator assemblies.

51. The evacuated energy storage device as recited in claim 50, wherein the first clearance is about 13 to about 17 mils.

52. The evacuated energy storage device as recited in claim 51, wherein the first clearance is about 15 mils.

53. The evacuated energy storage device as recited in claim 50, wherein the second clearance is about 8 to about 12 mils.

54. The evacuated energy storage device as recited in claim 53, wherein the second clearance is about 10 mils.

55. The evacuated energy storage device as recited in claim 46, wherein said upper and lower grounding plates and said plurality of more rigid bumpers are fabricated from at least one of aluminum, metal, alloys, carbon, carbon-carbon composites, and carbon fiber composite materials.

56. The evacuated energy storage device as recited in claim 46, wherein said plurality of more rigid bumpers is configured and arranged so as to substantially limit further relative displacement between the rotor and stator assemblies by frictionally engaging the outer race of the bearing assembly after an initial relative displacement equal in magnitude to a second clearance that separates said outer race of said bearing assembly from said plurality of more rigid bumpers.

57. The evacuated energy storage device as recited in claim 56, wherein said second clearance has a magnitude of about 8 to about 12 mils.

58. The evacuated energy storage device as recited in claim 57, wherein second clearance has a magnitude of about 10 mils.

59. The evacuated energy storage device as recited in claim 46, wherein the first stiffness of the one or more flexible dampers is about 500 lb/in to about 4000 lb/in.

60. The evacuated energy storage device as recited in claim 46, wherein the second stiffness of the plurality of more rigid bumpers is about 50,000 lb/in to about 250,000 lb/in.

61. The evacuated energy storage device as recited in claim 46, wherein the self-contained bearing assembly system further comprises a gasket that is fixedly attached to the plurality of more rigid bumpers, wherein said gasket is less rigid than said plurality of more rigid bumpers.

* * * * *